United States Patent
Zhang et al.

(10) Patent No.: US 9,219,420 B1
(45) Date of Patent: Dec. 22, 2015

(54) OVERVOLTAGE PROTECTION USING A TAPFET

(71) Applicant: Power Integrations, Inc., San Jose, CA (US)

(72) Inventors: Michael Zhang, Mountain View, CA (US); Ricardo L. J. Pregitzer, Campbell, CA (US); Tiziano Pastore, Los Gatos, CA (US); Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/569,520

(22) Filed: Dec. 12, 2014

Related U.S. Application Data

(60) Provisional application No. 62/077,115, filed on Nov. 7, 2014.

(51) Int. Cl.
  *H02M 1/34* (2007.01)
  *H02M 3/335* (2006.01)

(52) U.S. Cl.
  CPC .................................. *H02M 3/33507* (2013.01)

(58) Field of Classification Search
  CPC .......... H02M 1/32; H02M 1/34; H02M 1/36; H02M 3/33507; H02M 3/33523
  USPC ......... 363/50, 55, 56.01, 56.03, 56.04, 56.05, 363/95, 97
  See application file for complete search history.

(56) References Cited

U.S. PATENT DOCUMENTS

| | | | | |
|---|---|---|---|---|
| 6,525,515 B1* | 2/2003 | Ngo | ........................ | G05F 1/573 323/274 |
| 6,865,093 B2* | 3/2005 | Disney | ...................... | G05F 1/14 257/E29.021 |
| 7,002,398 B2* | 2/2006 | Disney | ............ | H01L 21/823493 327/534 |
| 7,911,812 B2* | 3/2011 | Colbeck | .............. | H02M 1/4225 363/21.02 |
| 8,416,596 B2* | 4/2013 | Huang | .............. | H02M 3/33507 363/21.11 |
| 2007/0133236 A1* | 6/2007 | Usui | ....................... | H02M 1/32 363/56.01 |
| 2008/0025054 A1* | 1/2008 | Yang | ................. | H02M 3/33507 363/56.01 |
| 2008/0043504 A1* | 2/2008 | Ye | ...................... | H02M 3/33507 363/97 |
| 2008/0084723 A1* | 4/2008 | Balakrishnan | ........ | H02M 3/335 363/97 |
| 2011/0211376 A1* | 9/2011 | Hosotani | ........... | H02M 3/33523 363/97 |
| 2011/0267846 A1* | 11/2011 | Djenguerian | ..... | H02M 3/33523 363/21.12 |
| 2011/0305053 A1* | 12/2011 | Lin | ........................ | H02M 1/44 363/95 |
| 2014/0145679 A1* | 5/2014 | Chen | ................... | H02M 3/1582 320/128 |
| 2014/0192569 A1* | 7/2014 | Espino | ................ | H02H 7/1213 363/50 |

* cited by examiner

*Primary Examiner* — Adolf Berhane
(74) *Attorney, Agent, or Firm* — Blakely Sokoloff Taylor & Zafman LLP

(57) ABSTRACT

Systems and processes for protecting a power converter against overvoltage conditions are disclosed. In one example, an overvoltage protection circuit may be used to sense the input voltage of the power converter to determine whether the input voltage is greater than a threshold value. In response to determining that the sensed input voltage is greater than the threshold value, an input capacitance and/or capacitance of an EMI filter of the power converter may be discharged to ground or an input return through a tapFET of a switching element of the power converter to protect the components of the device. The capacitance(s) may continue to be discharged through the tapFET for a duration of time after the sensed input voltage falls below the threshold value to allow the capacitance(s) to discharge to a safe level.

22 Claims, 3 Drawing Sheets

OVERVOLTAGE PROTECTION USING A TAPFET

CROSS REFERENCE TO RELATED APPLICATION

This application is claims priority to U.S. Provisional Patent application Ser. No. 62/077,115, filed Nov. 7, 2014, entitled OVERVOLTAGE PROTECTION USING A TAPFET, which is hereby incorporated by reference in its entirety for all purposes.

BACKGROUND

1. Field

The present disclosure relates generally to protection of power converters and, more specifically, to surge protection at an input of a power converter.

2. Discussion of the Related Art

Many electronic devices, such as cell phones, laptop computers, etc., use direct current (dc) power to operate. Conventional wall outlets generally deliver a high voltage alternating current (ac) power that needs to be transformed to dc power in order to be used as a power source by most electronic devices. Switched mode power converters are commonly used due to their high efficiency, small size, and low weight to convert the high voltage ac power to a regulated dc power. In operation, a controller of the switched mode power converter may provide output regulation by sensing the output of the power converter and controlling the switch in a closed loop. For example, the controller may receive a feedback signal representative of the output and then vary one of the control parameters (e.g., duty ratio or the number of ON and OFF cycles of the switch per unit time) based on the feedback signal to regulate the output to a desired quantity.

Power converters are occasionally exposed to surges in the received input voltage, which is generally referred to as an overvoltage condition. Switching of the power switch during these overvoltage conditions may damage various components within the power converter, such as the power switch. Thus, many power converters include overvoltage protection circuits to detect the overvoltage conditions and divert excess voltage in order to prevent damage to the power converter.

BRIEF DESCRIPTION OF THE DRAWINGS

Non-limiting and non-exhaustive embodiments of the present technology are described with reference to the following figures, wherein like reference numerals refer to like parts throughout the various views unless otherwise specified.

DETAILED DESCRIPTION

Figure 1:
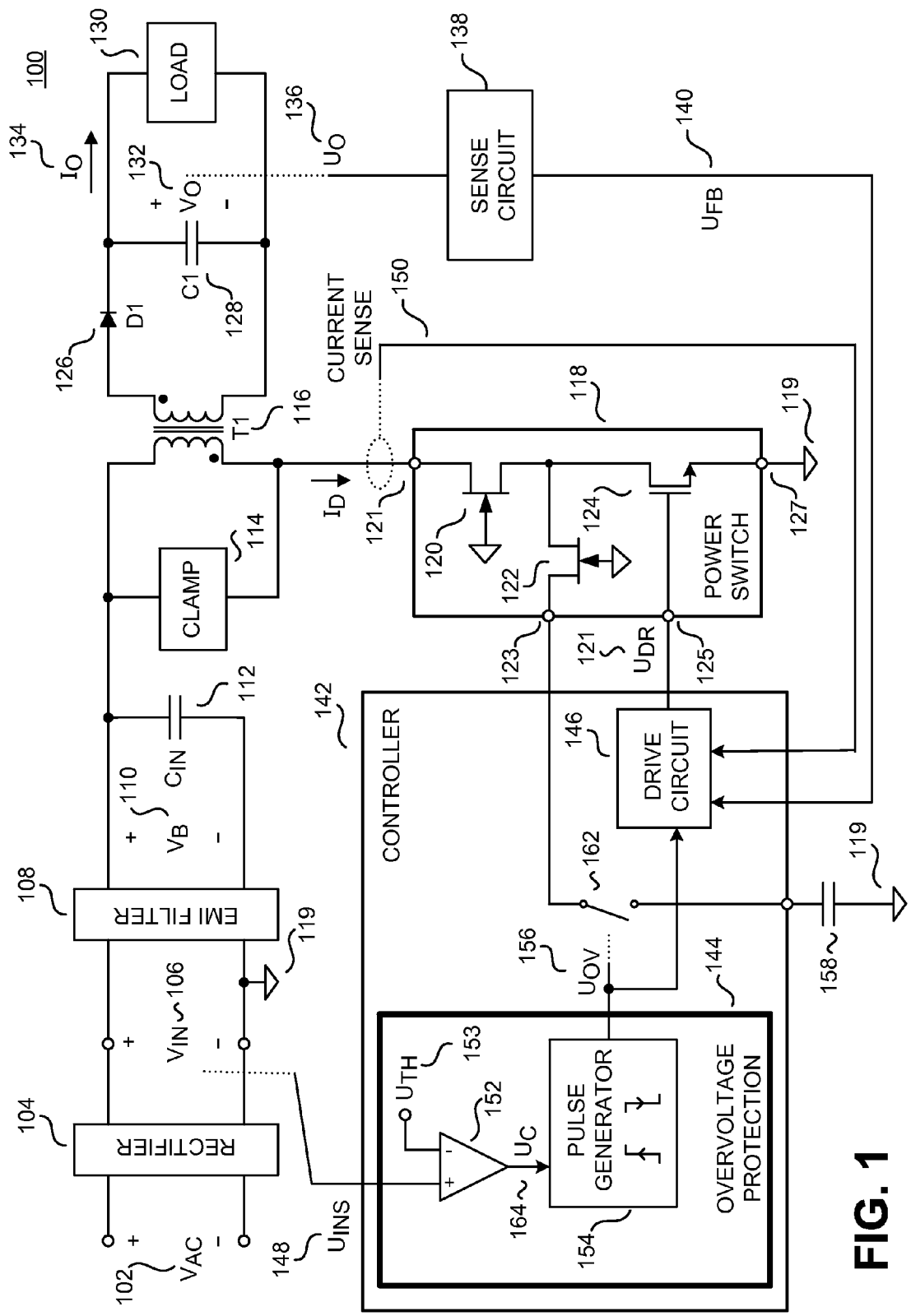
FIG. 1 shows a functional block diagram of a power converter including an overvoltage protection circuit according to various examples.

In the following description, numerous specific details are set forth in order to provide a thorough understanding of the present technology. It will be apparent, however, to one having ordinary skill in the art that the specific detail need not be employed to practice the present technology. In other instances, well-known materials or methods have not been described in detail in order to avoid obscuring the present technology.

Reference throughout this specification to "one embodiment", "an embodiment", "one example", or "an example" means that a particular feature, structure or characteristic described in connection with the embodiment or example is included in at least one embodiment of the present disclosure. Thus, appearances of the phrases "in one embodiment", "in an embodiment", "one example", or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

To provide a thorough understanding of the present technology, numerous details have been set forth and, in some cases, simplified equivalent implementation circuits have been described. However, it will be apparent to one having ordinary skill in the art that the equivalent simplified circuits may differ from the actual implementations and that all specific details need not be employed to practice the various examples. Additionally, it should be appreciated that in the description below and in all described examples, a switched-mode power supply may include a controller incorporated into an IC having some or none of the switching and power components in a monolithic or hybrid structure.

Systems and processes for protecting a power converter against overvoltage conditions are disclosed. In one example, an overvoltage protection circuit may be used to sense the input voltage of the power converter to determine whether the input voltage is greater than a threshold value. In response to determining that the sensed input voltage is greater than the threshold value, an input capacitance and/or capacitance of an EMI filter of the power converter may be discharged to ground or an input return through a tapFET of a switching element of the power converter to protect the components of the device. The capacitance(s) may continue to be discharged through the tapFET for a duration of time after the sensed input voltage falls below the threshold value to allow the capacitance(s) to discharge to a safe level.

FIG. 1 illustrates an example power converter 100 including rectifier 104, an EMI filter 108, an input capacitance 112, a clamp circuit 114, an energy transfer element T1 116, a power switch 118, an input return 119, an output rectifier 126, an output capacitance 128, a sense circuit 138, a controller 142, a load 130, and a capacitance 158. The power switch 118 is further shown as including junction field effect transistor (JFET) 120, a tapFET 122, a metal oxide field effect transistor (MOSFET) 124, and drain, source, gate, and tap terminals 121, 127, 125, and 123, respectively. The controller 142 is further illustrated as including an overvoltage protection circuit 144, drive circuit 146, and switch 162. As illustrated, the overvoltage protection circuit 144 further includes a comparator 152 and a pulse generator 154. Further illustrated in FIG. 1 is an ac input voltage $V_{AC}$ 102, an input voltage $V_{IN}$ 106, a bulk voltage $V_B$ 110, a drive signal $U_{DR}$ 121, an output voltage $V_O$ 132, an output current $I_O$ 134, an output quantity $U_O$ 136, a feedback signal $U_{FB}$ 140, an input sense signal $U_{INS}$ 148, a switch current sense signal 150, a comparator output $U_C$ 164, and an overvoltage signal $U_{OV}$ 156.

The power converter 100 provides output power to the load 130 from an unregulated ac input voltage $V_{AC}$ 102, also referred as a line signal. As shown, the rectifier 104 is coupled to receive and rectify the ac input voltage $V_{AC}$ 102 and outputs the input voltage $V_{IN}$ 106. In one example, the rectifier 104 may be a bridge rectifier. As illustrated, the input return 119 may be referenced from the input voltage $V_{IN}$ 106. The EMI filter 108 is further coupled to the rectifier 104 and outputs the bulk voltage $V_B$ 110. The input capacitance $C_{IN}$ 112 is also coupled to the EMI filter 108. As illustrated, the bulk voltage $V_B$ 110 is also the voltage across the input capacitance $C_{IN}$ 112. In one example, EMI filter 108 may include one or more filters made up of inductors and capacitors. The EMI filter 108, along with the input capacitance $C_{IN}$ 112, may filter low frequency ripple from the input of the power converter 100. In addition, the EMI filter 108, as illustrated, may delay the rise of the voltage at the terminals of power switch 118. As such, the EMI filter 108 may additionally protect the power switch 118. However, while a single EMI filter is illustrated, it should be appreciated that additional EMI filters may be included in the power converter. Further, the input capacitance $C_{IN}$ 112 may filter the high frequency current from the power switch 118. The input capacitance $C_{IN}$ 112 is further coupled to the energy transfer element T1 116. In some examples, the energy transfer element T1 116 may be a coupled inductor or may be a transformer. As shown, the energy transfer element T1 116 includes two windings, a primary winding and a secondary winding. However, the energy transfer element T1 116 may have more than two windings. The clamp circuit 114 is illustrated in the example of FIG. 1 as being coupled across the primary winding of the energy transfer element T1 116. The primary winding is further coupled to the power switch 118, which is then further coupled to input return 119.

As illustrated, the power switch 118 is exemplified as including a JFET 120, tapFET 122 (exemplified as a JFET), and a MOSFET 124. The drain terminal 121 of the power switch 118 (drain of the JFET 120) is coupled to the energy transfer element T1 116 while the source terminal 127 of the power switch 118 (source of the MOSET 124) is coupled to input return 119. Further, the source of the JFET 120 is coupled to the drain of the MOSFET 124. The drain terminal of the tapFET 122 is coupled between the JFET 120 and the MOSFET 124. Both of the gate terminals of the JFET 120 and tapFET 122 are coupled to return 119. The tap terminal 123 (source of tapFET 122) is coupled to the controller 142, while the gate terminal 125 (gate of the MOSFET 124) is coupled to receive the drive signal $U_{DR}$ 121 from the controller 142 and. In operation, the JFET 120 is a high-voltage device that protects the MOSFET 124. A portion of that JFET 120 (shown as the tapFET 122) may be used to divert a portion of the current conducted through the power switch 118. For example, the tapFET 122 may be used to charge a supply capacitor (shown as capacitance 158) of the controller 142 during startup of the power converter 100. In some examples, the tapFET 122 may further be used to discharge the input capacitance 112 and any capacitances within the EMI filter 108 when an overvoltage condition is sensed. As illustrated, the tap terminal 123 (source of tapFET 122) is coupled to the switch 162 of controller 142, which is then coupled to input return 119 through capacitor 158. As will be discussed in greater detail below, when an overvoltage condition is sensed, the switch 162 is turned ON and the tapFET 122 may be used to discharge the input capacitance 112 and any capacitances within the EMI filter 108. Examples of a power switch having a tapFET are described in greater detail in Applicants' U.S. Pat. Nos. 7,002,398 and 6,865,093, which are incorporated herein by reference in their entirety for all purposes.

The secondary winding of the energy transfer element T1 116 is coupled to the rectifier 126, which is exemplified as a diode D1. However, in some examples, the rectifier 126 may be a transistor used as a synchronous rectifier. Both the output capacitor C1 128 and load 130 are shown as being coupled to the rectifier 126. An output is provided to the load 130 as a regulated output voltage $V_O$ 132, regulated output current $I_O$ 134, or a combination of the two.

The power converter 100 further includes circuitry to regulate the output, exemplified as output quantity $U_O$ 136. In general, the output quantity $U_O$ 136 is either an output voltage $V_O$ 132, output current $I_O$ 134, or a combination of the two. A sense circuit 138 is coupled to sense the output quantity $U_O$ 136 and to provide the feedback signal $U_{FB}$ 140, which is representative of the output quantity $U_O$ 136, to the controller 142. The controller further includes terminals to receive the input sense signal $U_{INS}$ 148, which is representative of the input voltage $V_{IN}$ 106, to receive the switch current sense signal 150, which is representative of the switch current $I_D$, and to provide the drive signal $U_{DR}$ 121 to the power switch 118. The controller 142 provides drive signal $U_{DR}$ 121 to control various switching parameters of the power switch 118 to control the transfer of energy from the input to the output of the power converter 100. As illustrated, the controller 142 also includes a terminal coupled to return 119.

As illustrated in FIG. 1, the controller 142 further includes the overvoltage protection circuit 144, the drive circuit 146, and the switch 162. The drive circuit 146 is coupled to output the drive signal $U_{DR}$ 121 in response to the received current sense signal 150 and/or the feedback signal $U_{FB}$ 140. The overvoltage protection circuit 144 is coupled to receive the input sense signal $U_{INS}$ 148 and output the overvoltage signal $U_{OV}$ 156 to control switching of the switch 162. As will be further discussed, when an overvoltage condition is sensed, the overvoltage protection circuit 144 turns the switch 162 to an ON state, allowing the tapFET 122 to discharge the input capacitance 112 and any capacitances within the EMI filter 108. Further, the overvoltage signal $U_{OV}$ 156 is received by the drive circuit 146. In one example, when the overvoltage signal $U_{OV}$ 156 indicates that an overvoltage condition exists (for this example, the over voltage signal $U_{OV}$ 156 is logic high), the drive circuit 146 may output the drive signal $U_{DR}$ 121 to turn the MOSFET 124 of the power switch 118 OFF. The MOSFET 124 remains OFF until the over voltage signal $U_{OV}$ 156 indicates that there is no overvoltage condition (for this example, the over voltage signal $U_{OV}$ 156 is logic low).

The overvoltage protection circuit 144 is shown as including the comparator 152 and the pulse generator 154. In one example, the comparator 152 is coupled to receive the input sense signal $U_{INS}$ 148 (at the non-inverting input) and the threshold $U_{TH}$ 153 (at the inverting input). In another example, the comparator 152 may be a hysteretic comparator. The output of the comparator $U_C$ 164 is received by the pulse generator 154. As will be discussed in greater detail below, the pulse generator 154 may be triggered by both the rising and falling edges of the comparator output $U_C$ 164. The pulse generator 154 outputs the overvoltage signal $U_{OV}$ 156 in response to the comparator output $U_C$ 164.

In operation, the controller 142 senses that an overvoltage condition has occurred by comparing the input sense signal $U_{INS}$ 148 with the threshold $U_{TH}$ 153. When the input sense signal $U_{INS}$ 148 is greater than the threshold $U_{TH}$ 153, the comparator output $U_C$ 164 transitions from a logic low to a logic high value (referred to as a rising edge) and the overvoltage signal $U_{OV}$ 156 outputted by the pulse generator 154 transitions to a logic high value. This transition in the overvoltage signal $U_{OV}$ 156 causes switch 162 to close and be in the ON state, allowing the tapFET 122 to be coupled to return 119. As a result, the tapFET 122 provides a path to return 119 to discharge the input capacitance 112 and any capacitances within the EMI filter 108. As illustrated in FIG. 1, when the switch 162 is closed, the capacitor 158 may be charged. The voltage of capacitor 158 may continue to rise unless the controller clamps the voltage (not shown). Once the input sense signal $U_{INS}$ 148 has fallen below the threshold $U_{TH}$ 153, the comparator output $U_C$ 164 transitions from a logic high to a logic low value (referred to as a falling edge). The pulse generator 154 outputs the overvoltage signal $U_{OV}$ 156 such that the overvoltage signal $U_{OV}$ 156 remains at a logic high value for a set period of time (referred to as an extension period $T_{EX}$) after the falling edge of the comparator output $U_C$ 164. The extension period $T_{EX}$ provides additional time to discharge the input capacitance 112 and any capacitances within the EMI filter 108 such that the voltage across the input capacitance 112 (bulk voltage $V_B$ 110) may be within safe operating levels of the power converter. At the end of the extension period $T_{EX}$, the overvoltage signal $U_{OV}$ 156 falls to a logic low value and the switch 162 is opened. In a further example, if the comparator output $U_C$ 164 again transitions to a logic high value before the end of the extension period $T_{EX}$, the overvoltage signal $U_{OV}$ 156 remains logic high and the timer of the extension period $T_{EX}$ is restarted. The extension period $T_{EX}$ begins again once the comparator output $U_C$ 164 transitions to a logic low value for a second time. In addition, the over voltage signal $U_{OV}$ 156 may be received by the drive circuit 146. When the overvoltage signal $U_{OV}$ 156 indicates that an overvoltage condition exists (for this example, the over voltage signal $U_{OV}$ 156 is logic high), the drive circuit 146 may output the drive signal $U_{DR}$ 121 to turn the MOSFET 124 of the power switch 118 OFF. The MOSFET 124 remains OFF until the over voltage signal $U_{OV}$ 156 indicates that there is no overvoltage condition (for this example, the over voltage signal $U_{OV}$ 156 is logic low).

While power converter 100 is illustrated as being coupled in a flyback configuration, it should be appreciated that other configurations and/or topologies may be used. In addition, while the power converter 100 is illustrated is an isolated power converter (e.g., dc current may not conduct between the input and the output of the power converter), it should be appreciated that non-isolated power converters may also be used. Further, while the power switch 118 and the controller 142 are illustrated as separate blocks, it should be appreciated that the controller 142 and power switch 118 may form part of an integrated circuit that is manufactured as either a hybrid or monolithic integrated circuit.

Figure 2:
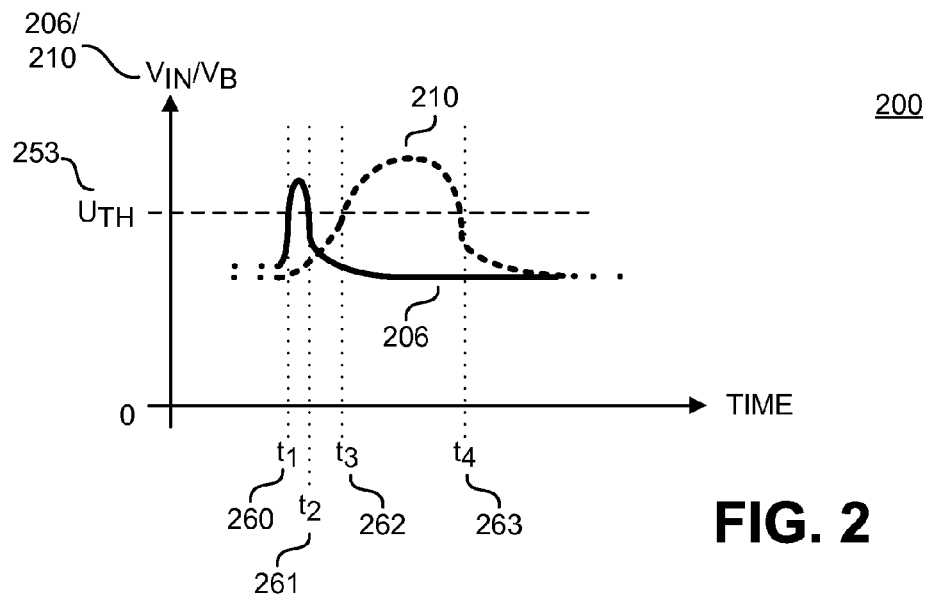
FIG. 2 shows example waveforms of an input voltage and a bulk voltage according to various examples.

FIG. 2 illustrates example waveforms 200 of the input voltage $V_{IN}$ 206 (represented by the solid line) and the bulk voltage $V_B$ 210 (represented by the dashed line), which are similar to the input voltage $V_{IN}$ 106 and the bulk voltage $V_B$ 110 shown in FIG. 1. However, FIG. 2 illustrates the example waveforms of the input voltage $V_{IN}$ 206 and the bulk voltage $V_B$ 210 without the use of an overvoltage protection circuit described herein. As shown, a surge occurs and the input voltage $V_{IN}$ 206 is greater than the threshold $U_{TH}$ 253 (which may be similar to threshold $U_{TH}$ 153) at time $t_1$ 260. The input voltage $V_{IN}$ 206 falls below the threshold $U_{TH}$ 253 at time $t_2$ 261. However, due to the inductances and capacitances of the EMI filter and the input capacitance, the effects of the surge are delayed. For instance, the bulk voltage $V_B$ 210 does not cross the threshold $U_{TH}$ 253 until time $t_3$ 262 and does not fall below the threshold $U_{TH}$ 253 until time $t_4$ 263. As such, a conventional overvoltage protection circuit that senses the input voltage $V_{IN}$ before the EMI filter would sense an overvoltage condition between time $t_1$ 260 and time $t_2$ 261. However, damage could also potentially occur between time $t_3$ 262 and time $t_4$ 263.

Figure 3:
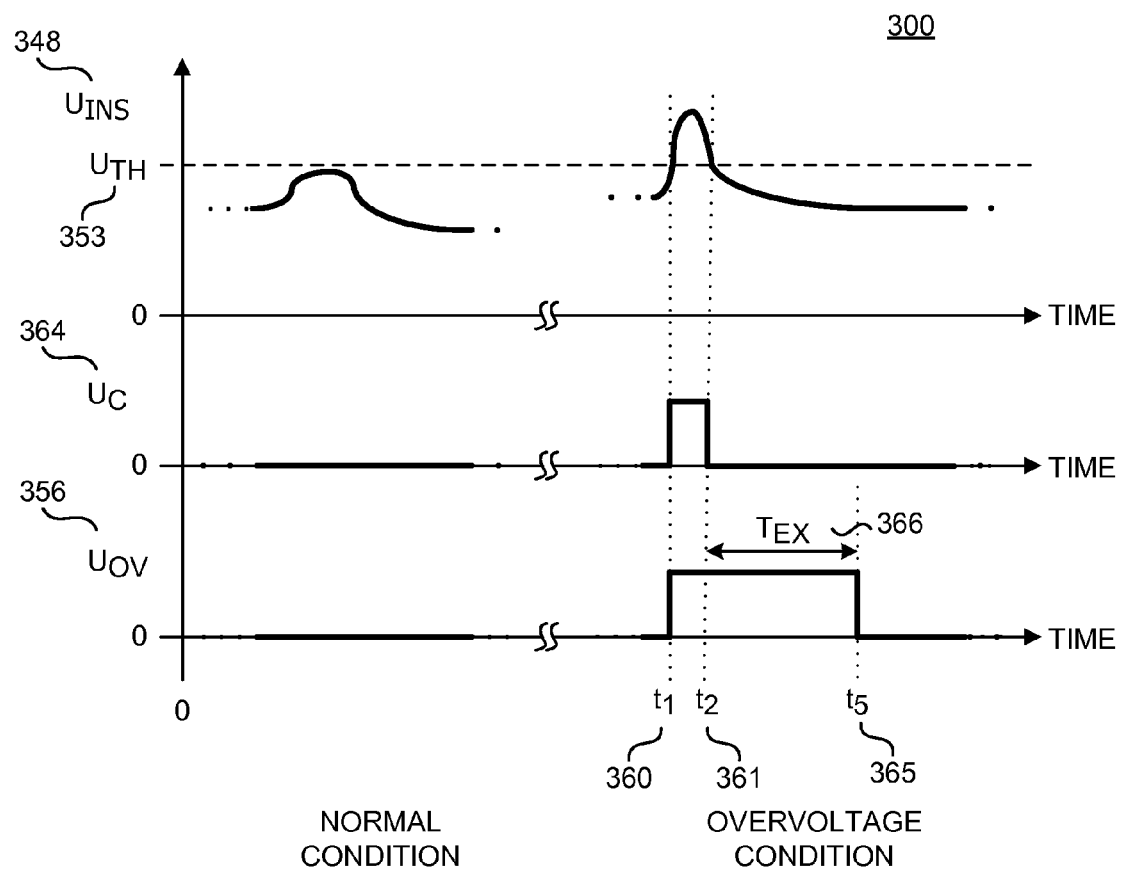
FIG. 3 shows a timing diagram of various signals of the power converter of FIG. 1 according to various examples.

FIG. 3 illustrates a timing diagram 300 of the input sense signal $U_{INS}$ 348 (representative of an input voltage $V_{IN}$ before the EMI filter), comparator output $U_C$ 364, and overvoltage signal $U_{OV}$ 356. The input sense signal $U_{INS}$ 348, comparator output $U_C$ 364, and overvoltage signal $U_{OV}$ 356 may be examples of the input sense signal $U_{INS}$ 148, comparator output $U_C$ 164, and overvoltage signal $U_{OV}$ 156 discussed in FIG. 1. Further illustrated in FIG. 3 are the threshold $U_{TH}$ 353, times $t_1$ 360, $t_2$ 361, and $t_5$ 365, and extension time $T_{EX}$ 366.

In normal conditions (illustrated on the left hand side of the timing diagram 300), the input sense signal $U_{INS}$ 348 is less than the threshold $U_{TH}$ 353. As such, the comparator output $U_C$ 364 remains logic low and the overvoltage signal $U_{OV}$ 356 remains logic low. In an overvoltage condition (illustrated on the right hand side of the timing diagram 300), the input sense signal $U_{INS}$ 348 is greater than the threshold $U_{TH}$ 353. In the example shown, the input sense signal $U_{INS}$ 348 crosses the threshold $U_{TH}$ 353 at time $t_1$ 360. As a result, the comparator output $U_C$ 364 transitions to a logic high value. The rising edge comparator output $U_C$ 364 results in the overvoltage signal $U_{OV}$ 356 transitioning to a logic high value. The input sense signal $U_{INS}$ 348 falls below the threshold $U_{TH}$ 353 at time $t_2$ 361 and the comparator output $U_C$ 364 also transitions to a logic low value at this time. At time $t_2$ 361, the extension time $T_{EX}$ 366 begins (trigged by the falling edge of the comparator output $U_C$ 364) and the overvoltage signal $U_{OV}$ 356 remains logic high. As shown, the input sense signal $U_{INS}$ 348 is below the threshold $U_{TH}$ 353 for the remainder of the extension time $T_{EX}$ 366. As such, the overvoltage signal $U_{OV}$ 356 remains logic high until the end of the extension time $T_{EX}$ 366 (shown as time $t_5$ 365). At time $t_5$ 365, the overvoltage signal $U_{OV}$ 356 transitions to a logic low value. By extending the overvoltage signal $U_{OV}$ 356, the overvoltage protection circuit may provide additional time for the tapFET (e.g., tapFET 122) to discharge the input capacitance (e.g., input capacitance 112) and any capacitances within the EMI filter (e.g., EMI filter 108). In one example, the extension time $T_{EX}$ 366 may be substantially equal to 500 milliseconds (ms). However, the length of the extension time $T_{EX}$ 366 may be the amount of time needed for the bulk voltage VB to fall below the threshold UTH given the value of the input capacitor and the value of the capacitances and inductors of the EMI filter.

Figure 4:
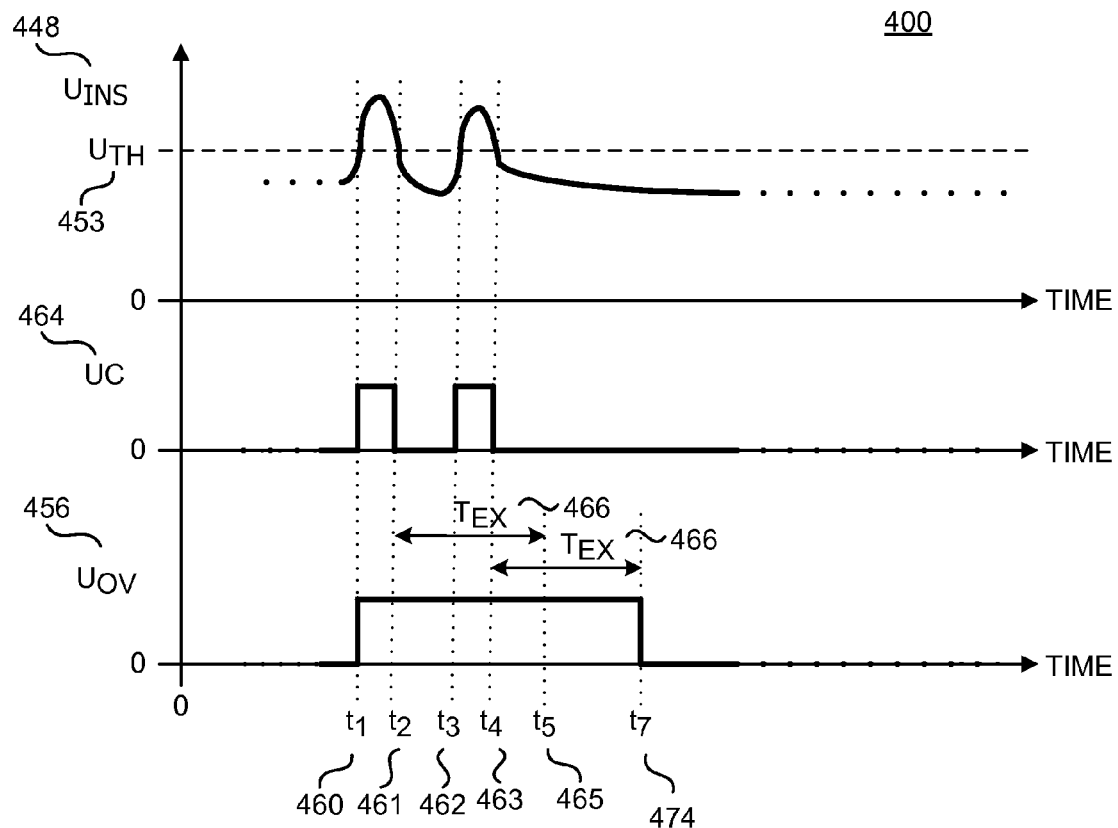
FIG. 4 shows another timing diagram of various signals of the power converter of FIG. 1 according to various examples.

FIG. 4 illustrates another timing diagram 400 of the input sense signal $U_{INS}$ 448 (representative of an input voltage $V_{IN}$ before the EMI filter), comparator output $U_C$ 464, and overvoltage signal $U_{OV}$ 456. The input sense signal $U_{INS}$ 448, comparator output $U_C$ 464, and overvoltage signal $U_{OV}$ 456 may be examples of the input sense signal $U_{INS}$ 148, comparator output $U_C$ 164, and overvoltage signal $U_{OV}$ 156 discussed in FIG. 1. Further illustrated in FIG. 4 are the threshold $U_{TH}$ 453, times $t_1$ 460, $t_2$ 461, $t_3$ 462, $t_4$ 463, $t_5$ 465, $t_7$ 474 and extension time $T_{EX}$ 466. The timing diagram 400 illustrates the occurrence of multiple overvoltage events.

At time $t_1$ 460, the input sense signal $U_{INS}$ 448 is greater than the threshold $U_{TH}$ 453 and an overvoltage event is sensed. The comparator output $U_C$ 464 and the overvoltage signal $U_{OV}$ 456 transition to a logic high value to turn on the switch 162 (shown in FIG. 1) and the tapFET may discharge the input capacitance and any capacitances within the EMI filter. At time $t_2$ 461, the input sense signal $U_{INS}$ 448 falls below the threshold $U_{TH}$ 453 and the comparator output $U_C$ 464 falls to a logic low value. Further, the extension time $T_{EX}$ 466 of the overvoltage signal $U_{OV}$ 456 begins. However, at time $t_3$ 462, another surge occurs and the input sense signal $U_{INS}$ 448 is greater than the threshold $U_{TH}$ 453. The comparator output $U_C$ 464 once again increases to a logic high value. The overvoltage signal $U_{OV}$ 456 remains logic high and the extension time $T_{EX}$ 466 is reset. At time $t_4$ 463, the input sense signal $U_{INS}$ 448 falls below the threshold $U_{TH}$ 453 and the comparator output $U_C$ 464 falls again to a logic low value. The extension time $T_{EX}$ 466 of the overvoltage signal $U_{OV}$ 456 once again begins. The comparator output $U_C$ 464 remains logic low for the rest of the extension time $T_{EX}$ 466 and the extension time $T_{EX}$ 466 ends at time $t_7$ 474. At time $t_7$ 474, the overvoltage signal $U_{OV}$ 456 falls to a logic low value.

Figure 5:
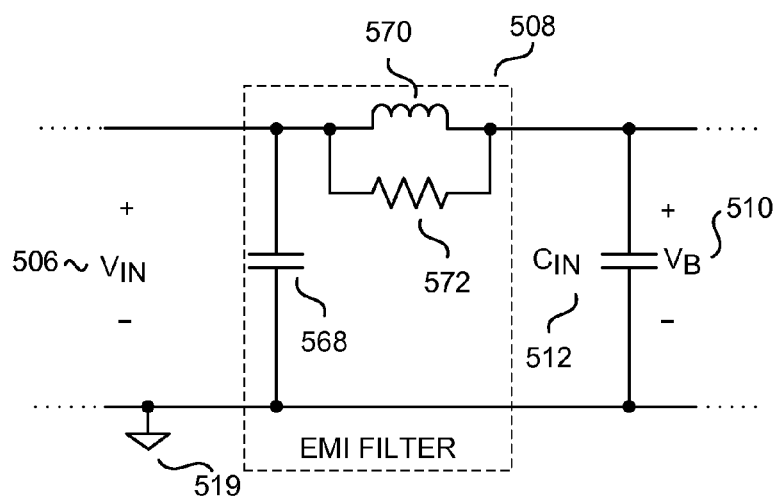
FIG. 5 shows an example electromagnetic (EMI) filter of the power converter of FIG. 1 according to various examples.

FIG. 5 illustrates an example EMI filter 508 that may be one example of the EMI filter 108 of FIG. 1. The EMI filter 508 is shown as including a capacitance 568, inductance 570, and resistance 572. The input capacitance $C_{IN}$ 512 may also form part of the EMI filter 508 as well as a bulk capacitance for the power converter. Further shown in FIG. 5 are the input voltage $V_{IN}$ 506 and the bulk voltage $V_B$ 510. Similarly named and numbered elements couple and function as described above.

The capacitance 568, inductance 570, resistance 572, and input capacitance $C_{IN}$ 512 may form a pi filter. As illustrated, the resistance 572 is coupled across the inductance 570. One end of the inductance 570 is coupled to the capacitance 568 while the other end is coupled to the input capacitance $C_{IN}$ 512. Capacitance 568 the input capacitance $C_{IN}$ 512 are further coupled to the input return 519. The input voltage $V_{IN}$ 506 is shown as the voltage across the capacitance 568, while the bulk voltage VB 510 is shown as the voltage across the input capacitance $C_{IN}$ 512.

The above description of illustrated examples of the present technology, including what is described in the Abstract, are not intended to be exhaustive or to be limitation to the precise forms disclosed. While specific embodiments of, and examples for, the present technology are described herein for illustrative purposes, various equivalent modifications are possible without departing from the broader spirit and scope of the present technology. Indeed, it is appreciated that the specific example voltages, currents, frequencies, power range values, times, etc., are provided for explanation purposes and that other values may also be employed in other embodiments and examples in accordance with the teachings of the present technology.

These modifications can be made to examples of the present technology in light of the above detailed description. The terms used in the following claims should not be construed to limit the present technology to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A control and switching circuit for a power converter, the control and switching circuit comprising:
    a power switching circuit comprising a first terminal, a second terminal, a third terminal, and a fourth terminal, wherein an amount of current conducted through the power switching circuit from the first terminal to the second and fourth terminals depends at least in part on a control signal received at the third terminal; and
    a control circuit coupled to the second and third terminals of the power switching circuit, wherein the control circuit is operable to receive an input sense signal representative of an input of the power converter and a feedback signal representative of an output of the power converter, and wherein the control circuit is configured to:
        output the control signal to the third terminal of the power switching circuit based at least in part on the feedback signal;
        couple the second terminal of the power switching circuit to a return of the power converter in response to the input sense signal being greater than a threshold value; and
        decouple the second terminal of the power switching circuit from the return of the power converter in response to the input sense signal not being greater than the threshold value for a threshold length of time.

2. The control and switching circuit of claim 1, wherein the control circuit comprises:
    a drive circuit operable to receive the feedback signal and coupled to output the control signal to the third terminal of the power switching circuit;
    a switch comprising a first end coupled to the second terminal of the power switching circuit and a second end operable to be coupled to the return of the power converter; and
    an overvoltage protection circuit operable to receive the input sense signal and coupled to output an overvoltage control signal to control the switch.

3. The control and switching circuit of claim 2, wherein the overvoltage protection circuit comprises:
    a comparator comprising a non-inverting terminal operable to receive the input sense signal and an inverting terminal operable to receive a threshold signal representative of the threshold value; and
    a pulse generator circuit coupled to receive an output of the comparator and to output the overvoltage control signal based on the output of the comparator.

4. The control and switching circuit of claim 3, wherein the pulse generator circuit is configured to:
    transition the overvoltage control signal to a value that causes the switch to be in an ON state in response to the output of the comparator being at a logic high value; and
    transition the overvoltage control signal to a value that causes the switch to be in an OFF state in response to the output of the comparator being at a logic low value for the threshold length of time.

5. The control and switching circuit of claim 2, wherein the drive circuit is further coupled to receive the overvoltage control signal, and wherein the drive circuit is configured to output the control signal at a level that disables operation of the power switching circuit in response to the overvoltage control signal indicating that an overvoltage condition exists.

6. The control and switching circuit of claim 1, wherein the power switching circuit comprises:
    a junction field effect transistor (JFET) comprising:
        a drain terminal corresponding to the first terminal of the power switching circuit;
        a gate terminal operable to be coupled to the return of the power converter;
        a tap terminal corresponding to the second terminal of the power switching circuit; and
        a source terminal, wherein a current conducted into the drain terminal of the JFET is equal to a current conducted out of the tap terminal of the JFET plus a current conducted out of the source terminal of the JFET; and a metal oxide field effect transistor (MOSFET) comprising:
  a drain terminal coupled to the source terminal of the JFET;
  a gate terminal corresponding to the third terminal of the power switching circuit and coupled to receive the control signal from the control circuit; and
  a source terminal corresponding to the fourth terminal of the power switching circuit.

7. The control and switching circuit of claim 1, wherein the control circuit is configured to couple the second terminal of the power switching circuit to the return of the power converter via a bypass capacitor.

8. The control and switching circuit of claim 1, wherein the control circuit is further operable to receive a current sense signal representative of the amount of current conducted through the power switching circuit, and wherein the control circuit is further configured to output the control signal based on the current sense signal.

9. The control and switching circuit of claim 1, wherein the input sense signal comprises a rectified input voltage of the power converter.

10. The control and switching circuit of claim 9, wherein the control circuit is coupled to receive the rectified input voltage from a terminal of the power converter located between a rectifier circuit of the power converter and a filter circuit of the power converter.

11. The control and switching circuit of claim 1, wherein coupling the second terminal of the power switching circuit to the return of the power converter causes an input capacitance of the power converter or a capacitance of filter circuit of the power converter to be discharged through the second terminal of the power switching circuit.

12. A power converter comprising:
  a rectifier operable to be coupled to receive an input line voltage and to output a rectified input line voltage;
  a filter circuit coupled to receive the rectified input line voltage and to output a filtered line voltage;
  an energy transfer element coupled to receive the filtered line voltage and output an output quantity; and
  a control and switching circuit comprising:
    a power switching circuit comprising a first terminal coupled to the energy transfer element, a second terminal, a third terminal, and a fourth terminal, wherein an amount of current conducted through the power switching circuit from the first terminal to the second and fourth terminals depends at least in part on a control signal received at the third terminal; and
    a control circuit coupled to the second and third terminals of the power switching circuit, wherein the control circuit is coupled to receive an input sense signal representative of the rectified input line voltage and a feedback signal representative of the output quantity, and wherein the control circuit is configured to:
      output the control signal to the third terminal of the power switching circuit based at least in part on the feedback signal;
      couple the second terminal of the power switching circuit to a return of the power converter in response to the input sense signal being greater than a threshold value; and
      decouple the second terminal of the power switching circuit from the return of the power converter in response to the input sense signal not being greater than the threshold value for a threshold length of time.

13. The power converter of claim 12, wherein the control circuit comprises:
  a drive circuit coupled to receive the feedback signal and coupled to output the control signal to the third terminal of the power switching circuit;
  a switch comprising a first end coupled to the second terminal of the power switching circuit and a second end coupled to the return of the power converter; and
  an overvoltage protection circuit coupled to receive the input sense signal and coupled to output an overvoltage control signal to control the switch.

14. The power converter of claim 13, wherein the overvoltage protection circuit comprises:
  a comparator comprising a non-inverting terminal coupled to receive the input sense signal and an inverting terminal coupled to receive a threshold signal representative of the threshold value; and
  a pulse generator circuit coupled to receive an output of the comparator and to output the overvoltage control signal based on the output of the comparator.

15. The power converter of claim 14, wherein the pulse generator circuit is configured to:
  transition the overvoltage control signal to a value that causes the switch to be in an ON state in response to the output of the comparator being at a logic high value; and
  transition the overvoltage control signal to a value that causes the switch to be in an OFF state in response to the output of the comparator being at a logic low value for the threshold length of time.

16. The power converter of claim 13, wherein the drive circuit is further coupled to receive the overvoltage control signal, and wherein the drive circuit is configured to output the control signal at a level that disables operation of the power switching circuit in response to the overvoltage control signal indicating that an overvoltage condition exists.

17. The power converter of claim 12, wherein the power switching circuit comprises:
  a junction field effect transistor (JFET) comprising:
    a drain terminal corresponding to the first terminal of the power switching circuit;
    a gate terminal coupled to the return of the power converter;
    a tap terminal corresponding to the second terminal of the power switching circuit; and
    a source terminal, wherein a current conducted into the drain terminal of the JFET is equal to a current conducted out of the tap terminal of the JFET plus a current conducted out of the source terminal of the JFET; and
  a metal oxide field effect transistor (MOSFET) comprising:
    a drain terminal coupled to the source terminal of the JFET;
    a gate terminal corresponding to the third terminal of the power switching circuit and coupled to receive the control signal from the control circuit; and
    a source terminal corresponding to the fourth terminal of the power switching circuit.

18. The power converter of claim 12, wherein the power converter further comprises a bypass capacitor coupled to the control circuit, and wherein the control circuit is configured to couple the second terminal of the power switching circuit to the return of the power converter via the bypass capacitor.

19. The power converter of claim 12, wherein the control circuit is further coupled to receive a current sense signal representative of the amount of current conducted through the power switching circuit, and wherein the control circuit is further configured to output the control signal based on the current sense signal.

20. The power converter of claim 12, wherein coupling the second terminal of the power switching circuit to the return of the power converter causes an input capacitance of the power converter or a capacitance of the filter circuit to be discharged through the second terminal of the power switching circuit.

21. The power converter of claim 12, wherein the filter circuit comprises a pi filter.

22. The power converter of claim 12, wherein the power converter is a flyback converter.

\* \* \* \* \*